N. H. BORGFELDT.
PREPARING TOBACCO-STEMS.
No. 176,458. Patented April 25, 1876.
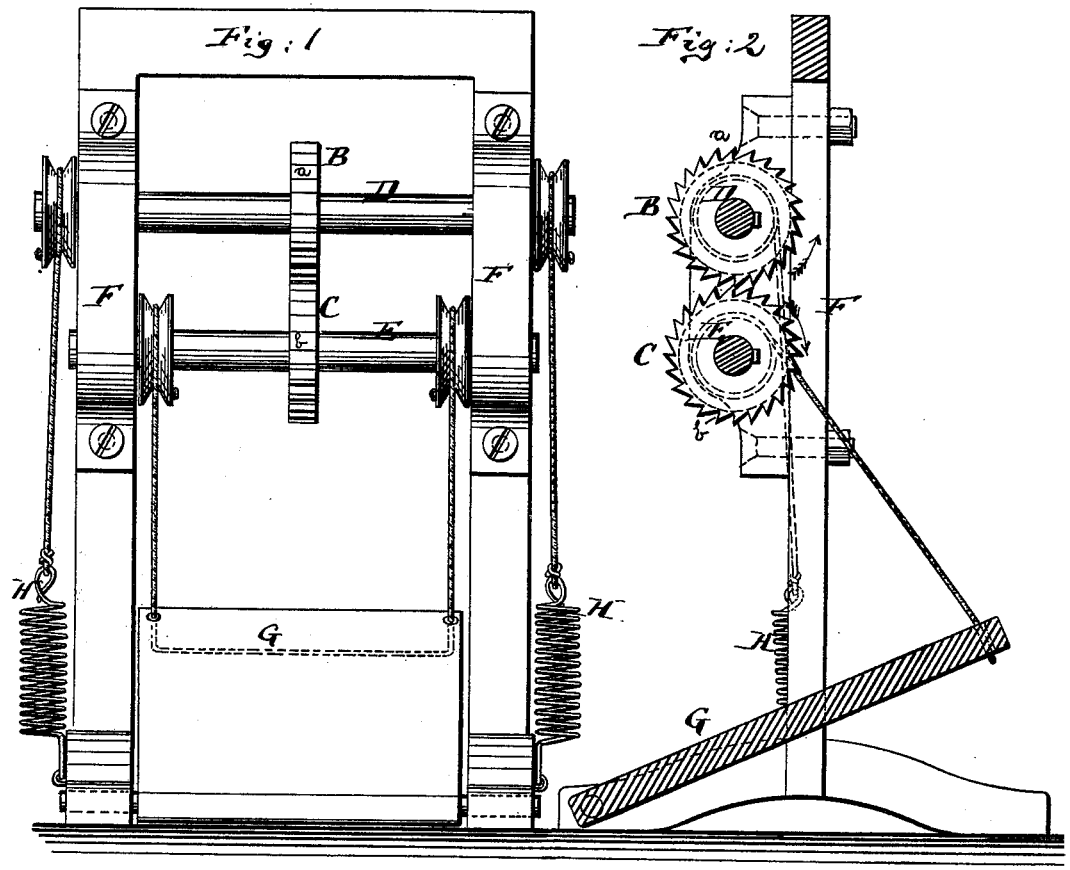
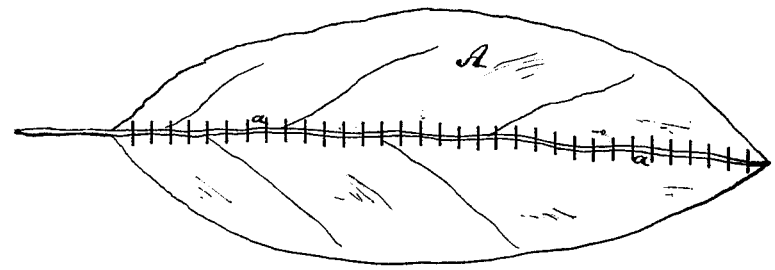

UNITED STATES PATENT OFFICE.

NICHOLAS H. BORGFELDT, OF NEW YORK, N. Y.

IMPROVEMENT IN PREPARING TOBACCO-STEMS.

Specification forming part of Letters Patent No. 176,458, dated April 25, 1876; application filed February 28, 1876.

*To all whom it may concern:*

Be it known that I, NICHOLAS H. BORGFELDT, of New York city, in the county of New York and State of New York, have invented a new and Improved Apparatus for and Method of Preparing Tobacco Stems, of which the following is a specification:

Figure 1 is a front elevation, and Fig. 2 a vertical transverse section, of my improved apparatus for preparing tobacco stems. Fig. 3 is a face view of a tobacco-leaf, having its stem prepared according to my invention.

Similar letters of reference indicate corresponding parts in all the figures.

This invention has for its object to so treat the stems of tobacco-leaves that they may remain therein while the leaves are worked into cigars, and will not interfere with the proper use, handling, and reduction of such leaves. It has heretofore been the practice either to strip, to compress, or to crush the stems of tobacco-leaves. By stripping the leaves a large percentage of tobacco is lost, and the remainder rendered more liable to crumble, and the leaves are, moreover, reduced in width, which is objectionable. When the stems are compressed they are made still stronger and tougher than they were before compression, and render it difficult to tear the leaves into lengths suitable for the cigars which are to be produced. In tearing leaves whose stems are compressed it often happens that the stems are stripped out of one part and remain on the other part of a leaf, thus spoiling the tobacco and causing much annoyance in operation. The like objections substantially apply to the crushing of the stems. My invention consists, principally, in cutting the stems into short sections and retaining the cut sections in the leaves, so that the latter will retain their full width, be readily torn into suitable lengths, and conveniently worked into cigars with the stem-sections therein. I have found it very difficult so to cut the stems, for the reason that the tenacious stem will adhere to the blades that cut it, and thus interfere with a speedy and economical cutting process; but by the use of a pair of rotary ratchet-like cutters, which act like shears, the difficulty above referred to is overcome, as every successive ratchet-tooth causes the leaf to withdraw from the preceding teeth.

In the drawing, the letter A represents a tobacco-leaf, of which the stem *a* has been cut into short sections in accordance with my invention. It is obvious that by this cutting process the leaf is rendered properly pliable in every direction, and that it is readily torn into suitable lengths. A leaf thus prepared can be wholly worked into cigars, and the labor and loss occasioned by stripping are thus avoided. B and C are the two shearing or cutting rollers. Each has the appearance of a ratchet-wheel with straight or oblique teeth. The teeth *a* of the roller B are in appearance like saw-teeth, as shown in Fig. 2, and have the full width of the roller, their working edges being radial on the roller, as shown in Fig. 1. The same description applies to the teeth *b* of the roller C. The said rollers are mounted upon shafts D and E, respectively, that are hung in a suitable frame, F. To one of these shafts, E, rotary motion is imparted by suitable mechanism, preferably by a treadle, G, which turns said shaft in the direction of the arrow shown in Fig. 2. The teeth *a* and *b* of the two rollers B and C are set alike, so that they face each other where the rollers come into contact, as shown. Thus, when the roller C is turned by the treadle, that one of its teeth, *b*, which strikes a tooth, *a*, of the roller B causes the last-mentioned roller to turn in the opposite direction, and thus the ratchet-cutter B is turned during operation by the ratchet-cutter C, or vice versa. The tobacco-leaf is introduced between the two ratchet-cutters B C, so that its stem will be grasped and sheared or cut by the teeth, as their faces move along one another. It will be observed that I thus obtain quite a peculiar cutting action, which, however, is admirably adapted to my purpose, as it prevents the adhesion of the cut stem to either cutter, and also feeds the leaf properly along.

The motion of the rollers B C may either be continuous in the directions indicated or intermittent, in which latter case I prefer to wind up a weight or spring, H, by the shaft D, so that when the treadle is let go this spring or weight, in unwinding or contracting, will revolve the shaft D in the opposite direction, and with it the shaft E and their respective cutters B C.

I claim as my invention—

1. The process herein described of preparing tobacco-leaves by cutting the stems in the leaves into short sections, and leaving the cut sections in the leaves, substantially as specified.

2. In a machine for cutting tobacco, the combination of the rotary ratchet cutter B, having the teeth $a$, with the ratchet-cutter C, having the teeth $b$, for operation substantially as specified.

3. The combination of the shaft E and cutter C, having the teeth $b$, with the shaft D, cutter B, having the teeth $a$, and with the spring or weight H, substantially as and for the purpose herein shown and described.

NICHOLAS H. BORGFELDT.

Witnesses:
 ERNEST C. WEBB,
 ANSELM MORAGA.